United States Patent
Clark

(10) Patent No.: US 11,798,426 B2
(45) Date of Patent: Oct. 24, 2023

(54) AUTONOMOUS MISSION ACTION ALTERATION

(71) Applicant: FIRMATEK SOFTWARE, LLC, San Antonio, TX (US)

(72) Inventor: Robert Parker Clark, Palo Alto, CA (US)

(73) Assignee: Firmatek Software, LLC, San Antonio, TX (US)

( * ) Notice: Subject to any disclaimer, the term of this patent is extended or adjusted under 35 U.S.C. 154(b) by 0 days.

(21) Appl. No.: 17/697,658

(22) Filed: Mar. 17, 2022

(65) Prior Publication Data
US 2022/0292992 A1    Sep. 15, 2022

Related U.S. Application Data

(63) Continuation of application No. 16/698,071, filed on Nov. 27, 2019, now abandoned, which is a
(Continued)

(51) Int. Cl.
*G08G 5/00*    (2006.01)
*G05D 1/00*    (2006.01)
(Continued)

(52) U.S. Cl.
CPC ......... *G08G 5/0039* (2013.01); *B64C 39/024* (2013.01); *G01C 7/04* (2013.01);
(Continued)

(58) Field of Classification Search
CPC .. G08G 5/0039; G08G 5/0013; G08G 5/0021; B64C 39/024; G01C 7/04; G05D 1/0094
See application file for complete search history.

(56) References Cited

U.S. PATENT DOCUMENTS 6,463,343 B1    10/2002   Emens et al.
6,813,559 B1    11/2004   Bodin et al.
(Continued)

FOREIGN PATENT DOCUMENTS

CN    205353774 U    6/2016
CN    106576383 A    4/2017
(Continued)

OTHER PUBLICATIONS

Beard, Randal, et al. "Cooperative Forest Fire Surveillance Using a Team of Small Unmanned Air Vehicles" (2006) II Faculty Publications. Paper 1228.
(Continued)

*Primary Examiner* — Tan Q Nguyen

(57) ABSTRACT

An unmanned aerial vehicle includes a camera, one or more sensors, memory storing first instructions that define an overall mission, and memory storing one or more mission cues. The vehicle further includes one or more processors configured to execute a first part of the first instructions to perform a first part of the overall mission. The processors are configured to process at least one of the image data and the sensor data to detect a presence of at least one of the mission cues. The processors are configured to, in response to detecting a mission cue, interrupting execution of the first instructions and executing second instructions to control the unmanned aerial vehicle to perform a first sub-mission of the overall mission. The processors are configured to after executing the second instructions, performing a second part of the overall mission by executing a second part of the first instructions.

13 Claims, 13 Drawing Sheets

Related U.S. Application Data continuation of application No. 16/056,911, filed on Aug. 7, 2018, now Pat. No. 10,540,901, which is a continuation-in-part of application No. 15/360,681, filed on Nov. 23, 2016, now Pat. No. 10,060,741, and a continuation of application No. 15/360,870, filed on Nov. 23, 2016, now Pat. No. 10,126,126.

(60) Provisional application No. 62/258,917, filed on Nov. 23, 2015, provisional application No. 62/258,917, filed on Nov. 23, 2015.

(51) Int. Cl.

| | | |
|---|---|---|
| *H04N 7/18* | (2006.01) | |
| *G01C 7/04* | (2006.01) | |
| *B64C 39/02* | (2023.01) | |
| *G06V 20/10* | (2022.01) | |
| *G06V 20/17* | (2022.01) | |
| *B64D 31/06* | (2006.01) | |
| *B64U 10/10* | (2023.01) | |
| *B64U 30/20* | (2023.01) | |
| *B64U 50/13* | (2023.01) | |
| *B64U 101/30* | (2023.01) | |

(52) U.S. Cl.
CPC ........... *G05D 1/0094* (2013.01); *G06V 20/17* (2022.01); *G06V 20/176* (2022.01); *G08G 5/0013* (2013.01); *G08G 5/0021* (2013.01); *G08G 5/0034* (2013.01); *G08G 5/0069* (2013.01); *G08G 5/0086* (2013.01); *H04N 7/183* (2013.01); *H04N 7/185* (2013.01); *H04N 7/188* (2013.01); *B64D 31/06* (2013.01); *B64U 10/10* (2023.01); *B64U 30/20* (2023.01); *B64U 50/13* (2023.01); *B64U 2101/30* (2023.01); *B64U 2201/10* (2023.01)

(56) References Cited

U.S. PATENT DOCUMENTS

| | | | |
|---|---|---|---|
| 6,856,894 B1 | 2/2005 | Bodin et al. | |
| 7,107,148 B1 | 9/2006 | Bodin et al. | |
| 7,130,741 B2 | 10/2006 | Bodin et al. | |
| 7,228,232 B2 | 6/2007 | Bodin et al. | |
| 7,231,294 B2 | 6/2007 | Bodin et al. | |
| 7,286,913 B2 | 10/2007 | Bodin et al. | |
| 7,418,320 B1 | 8/2008 | Bodin et al. | |
| 7,469,183 B2 | 12/2008 | Bodin et al. | |
| 7,509,212 B2 | 3/2009 | Bodin et al. | |
| 7,546,187 B2 | 6/2009 | Bodin et al. | |
| 8,019,490 B2 | 9/2011 | Ferren et al. | |
| 8,179,257 B2 | 5/2012 | Allen et al. | |
| 8,401,222 B2 | 3/2013 | Thornberry et al. | |
| 8,902,308 B2 | 12/2014 | Rinner et al. | |
| 8,930,044 B1 | 1/2015 | Peeters et al. | |
| 9,147,260 B2 | 9/2015 | Hampapur et al. | |
| 9,170,117 B1 | 10/2015 | Abuelsaad et al. | |
| 9,245,183 B2 | 1/2016 | Haas et al. | |
| 9,310,518 B2 | 4/2016 | Haas et al. | |
| 9,317,659 B2 | 4/2016 | Balinski et al. | |
| 9,323,895 B2 | 4/2016 | Balinski et al. | |
| 9,355,316 B2 | 5/2016 | Stevens et al. | |
| 9,363,008 B2 | 6/2016 | Boss et al. | |
| 9,412,278 B1 | 8/2016 | Gong et al. | |
| 9,447,448 B1 | 9/2016 | Kozloski et al. | |
| 9,460,616 B1 | 10/2016 | Miyahira et al. | |
| 9,463,875 B2 * | 10/2016 | Abuelsaad ............. G08G 1/166 | |
| 9,467,839 B1 | 10/2016 | Nishimura et al. | |
| 9,471,064 B1 | 10/2016 | Boland et al. | |
| 9,481,460 B1 | 11/2016 | Kozloski et al. | |
| 9,534,917 B2 | 1/2017 | Abuelsaad et al. | |
| 9,576,482 B2 | 2/2017 | Yamamoto | |
| 9,582,719 B2 | 2/2017 | Haas et al. | |
| 9,584,977 B2 | 2/2017 | Yamamoto | |
| 9,593,806 B2 | 3/2017 | Allen et al. | |
| 9,600,997 B1 | 3/2017 | Abrahams et al. | |
| 9,613,274 B2 | 4/2017 | Stevens et al. | |
| 9,632,509 B1 | 4/2017 | Aphek et al. | |
| 9,637,233 B2 | 5/2017 | Bivens et al. | |
| 9,639,960 B1 | 5/2017 | Loveland et al. | |
| 9,646,493 B2 | 5/2017 | Yamamoto | |
| 9,659,503 B2 | 5/2017 | Gordon et al. | |
| 9,699,622 B1 | 7/2017 | Nishimura et al. | |
| 9,702,830 B1 | 7/2017 | Akselrod et al. | |
| 9,734,397 B1 | 8/2017 | Larson et al. | |
| 9,734,684 B2 | 8/2017 | Bryson et al. | |
| 9,734,725 B2 | 8/2017 | Gordon et al. | |
| 9,773,398 B2 | 9/2017 | Abrahams et al. | |
| 9,823,658 B1 | 11/2017 | Loveland et al. | |
| 9,886,632 B1 | 2/2018 | Loveland et al. | |
| 9,922,405 B2 | 3/2018 | Sauder et al. | |
| 10,365,646 B1 * | 7/2019 | Farnsworth ........ G06Q 10/0833 | |
| 2009/0015674 A1 | 1/2009 | Alley et al. | |
| 2010/0084513 A1 | 4/2010 | Gariepy et al. | |
| 2010/0100269 A1 | 4/2010 | Ekhaguere et al. | |
| 2010/0110074 A1 | 5/2010 | Pershing | |
| 2010/0114537 A1 | 5/2010 | Pershing | |
| 2012/0044710 A1 | 2/2012 | Jones | |
| 2013/0317667 A1 | 11/2013 | Kruglick | |
| 2013/0325325 A1 * | 12/2013 | Djugash ............. G01C 21/3697 701/425 |
| 2014/0018979 A1 | 1/2014 | Goossen et al. | |
| 2014/0025229 A1 | 1/2014 | Levien et al. | |
| 2015/0254738 A1 | 9/2015 | Wright et al. | |
| 2015/0323930 A1 | 11/2015 | Downey et al. | |
| 2016/0023760 A1 | 1/2016 | Goodrich | |
| 2016/0070265 A1 * | 3/2016 | Liu ..................... B64C 39/024 701/25 |
| 2016/0132748 A1 | 5/2016 | Tillotson | |
| 2016/0178803 A1 | 6/2016 | Haas et al. | |
| 2016/0179096 A1 | 6/2016 | Bradlow et al. | |
| 2016/0191142 A1 | 6/2016 | Boss et al. | |
| 2016/0313736 A1 * | 10/2016 | Schultz .................. G06T 11/60 | |
| 2016/0325835 A1 | 11/2016 | Abuelsaad et al. | |
| 2016/0378109 A1 * | 12/2016 | Raffa .................. G08G 5/0043 701/2 |
| 2017/0092109 A1 * | 3/2017 | Trundle ............. H04B 7/18504 | |
| 2017/0146344 A1 | 5/2017 | Clark | |
| 2017/0154535 A1 | 6/2017 | Downey et al. | |
| 2017/0160752 A1 | 6/2017 | Boland et al. | |
| 2017/0176194 A1 | 6/2017 | Gordon et al. | |
| 2017/0178500 A1 | 6/2017 | Miyahira et al. | |
| 2017/0178501 A1 | 6/2017 | Miyahira et al. | |
| 2017/0188545 A1 | 7/2017 | Bivens et al. | |
| 2017/0213084 A1 | 7/2017 | Akselrod et al. | |
| 2017/0213455 A1 | 7/2017 | Yamamoto | |
| 2017/0336806 A1 | 11/2017 | Blanc-Paques et al. | |
| 2018/0122246 A1 | 5/2018 | Clark | |
| 2018/0157255 A1 | 6/2018 | Halverson et al. | |
| 2018/0246529 A1 | 8/2018 | Hu et al. | |
| 2020/0388169 A1 | 12/2020 | Barr et al. | |

FOREIGN PATENT DOCUMENTS

| | | |
|---|---|---|
| DE | 12011103690 | 9/2013 |
| EP | 2881827 A1 | 6/2015 |
| GB | 500839 A | 10/2013 |
| JP | 2008-186145 A | 8/2008 |
| JP | 6095018 B2 | 3/2017 |
| WO | 2007/124014 A3 | 8/2008 |
| WO | 2012/175592 A1 | 12/2012 |
| WO | 2013/141922 A2 | 9/2013 |
| WO | 2016/015943 A1 | 2/2016 |
| WO | 2016/203385 A1 | 12/2016 |

OTHER PUBLICATIONS

Elfes, Alberto. "Using Occupancy Grids for Mobile Robot Perception and Navigation." Computer 22.6 (1989): 46-57.

(56) References Cited

OTHER PUBLICATIONS

Hornung, Armin, et al. "OctoMap: An Efficient Probabilistic 30 Mapping Framework Based on Octrees" utonomous Robots Preprint (2013): 1-17.
International Search Report and Written Opinion dated Feb. 20, 2017, received in PCT/US2016/063669, filed Nov. 23, 2016.
Pesti, Peter, et al. "Low-Cost Orthographic Imagery" Proceedings of the 16th ACM SIGSPATIAL International Conference on Advances in Geographic Information Systems. ACM, 2008.
Pike, R. J., et al. Geomorphometry: a brief guide: Developments in Soil Science 33 (2009): 3-30.
Souza, Anderson AS, et al. "30 Probabilistic Occupancy Grid to Robotic Mapping with Stereo Vision." INTECH Open ccess Publisher (2012): 181-198.
Vandeportaele, Bertrand, et al. "ORIENT-CAM, a camera that knows its orientation and some applications" Progress in Pattern Recognition, Image Analysis and Applications (2006): 267-276.
Yahyanejad, Saeed, et al. "Incremental Mosaicking of Images from Autonomous, Small-Scale UAVs." Advanced Video and Signal Based Surveillance (AVSS), 2010 Seventh IEEE International Conference on IEEE, 2010.

\* cited by examiner

AUTONOMOUS MISSION ACTION ALTERATION

CROSS-REFERENCE TO RELATED APPLICATIONS

This application is a continuation of application Ser. No. 16/698,071, filed Nov. 27, 2019, which is a continuation of application Ser. No. 16/056,911, filed Aug. 7, 2018, now U.S. Pat. No. 10,540,901, which is a continuation-in-part of application Ser. No. 15/360,681, filed Nov. 23, 2016, now U.S. Pat. No. 10,060,741, which claims the benefit of Provisional Application No. 62/258,917, filed Nov. 23, 2015, and application Ser. No. 16/056,911 is also a continuation-in-part of application Ser. No. 15/360,870, filed Nov. 23, 2016, now U.S. Pat. No. 10,126,126, which claims the benefit of Provisional Application No. 62/258,917, filed Nov. 23, 2015, the disclosures of which are incorporated by reference herein in their entirety.

BACKGROUND

1. Field

The described technology generally relates to flight control for unmanned aerial vehicles (UAVs).

2. Description of Related Art

An unmanned aerial vehicle also commonly referred to as drone, can travel through a variety of environments, such as indoor, outdoor, and/or mixed indoor and outdoor environments. In some cases, an autonomous or semi-autonomous vehicle can be configured to conduct surveillance, security, delivery, monitoring, or other tasks that can comprise combining movement and data collection. As the vehicle performs such a "mission", it can travel according to a flight path. In the case of applications such as surveillance, monitoring, and inspection, large amounts of data may be gathered over the course of a mission. This data may be stored on the unmanned aerial vehicle during the mission, or some or all of the data may be transmitted by the unmanned aerial vehicle to a ground station or to a wide area network such as the internet.

SUMMARY

The methods and devices of the described technology each have several aspects, no single one of which is solely responsible for its desirable attributes.

In some embodiments, an unmanned aerial vehicle is provided. The vehicle includes a camera configured to generate image data. The vehicle includes one or more sensors configured to generate sensor data. The vehicle includes memory storing first travel and data acquisition instructions that define an overall mission for the unmanned aerial vehicle. The vehicle includes memory storing one or more mission cues comprising one or more pre-defined image data characteristics and/or sensor data characteristics. The vehicle includes one or more processors configured to execute a first part of the first travel and data acquisition instructions to control the unmanned aerial vehicle to perform a first part of the overall mission. The one or more processors are configured to process at least one of the image data and the sensor data to detect a presence of at least one of the mission cues. The one or more processors are configured to, in response to detecting a mission cue, interrupting execution of the first travel and data acquisition instructions and executing second travel and data acquisition instructions to control the unmanned aerial vehicle to perform a first sub-mission of the overall mission. The one or more processors are configured to, after executing the second travel and data acquisition instructions, performing a second part of the overall mission by executing a second part of the first travel and data acquisition instructions.

In some embodiments, an unmanned aerial vehicle is provided. The vehicle includes a plurality of sensors configured to generate sensor data. The vehicle includes memory storing first flight plan and sensor operation instructions that define an overall mission for the unmanned aerial vehicle. The vehicle includes memory storing one or more pre-defined sensor data characteristics corresponding to one or more mission cues. The vehicle includes one or more processors configured to execute a first part of the first flight plan and sensor operation instructions to control the unmanned aerial vehicle to perform a first part of the overall mission. The one or more processors are configured to detect a presence of at least one of the pre-defined sensor data characteristics in the sensor data, generated during execution of the first part of the overall mission. The one or more processors are configured to, in response to the detecting, interrupting execution of the first flight plan and sensor operation instructions and executing second flight plan and sensor operation instructions to control the unmanned aerial vehicle to perform a first sub-mission of the overall mission. The one or more processors are configured to, after executing the second flight plan and sensor operation instructions, performing a second part of the overall mission by executing a second part of the first flight plan and sensor operation instructions.

In some embodiments, in an unmanned aerial vehicle, a method of gathering data is provided. The method includes executing a first part of first travel and data acquisition instructions to control the unmanned aerial vehicle to perform a first part of an overall mission. The method includes generating at least one photographic image utilizing a camera and sensor data utilizing at least one sensor during the first part of the overall mission. The method includes processing at least one of the photographic images and the sensor data to detect a presence of at least one mission cue characterized by one or more pre-defined image data characteristics and/or sensor data characteristics. The method includes in response to detecting a mission cue, interrupting execution of the first travel and data acquisition instructions and executing second travel and data acquisition instructions to control the unmanned aerial vehicle to perform a first sub-mission of the overall mission. The method includes, after executing the second travel and data acquisition instructions, performing a second part of the overall mission by executing a second part of the first travel and data acquisition instructions.

BRIEF DESCRIPTION OF THE DRAWINGS

These drawings and the associated description herein are provided to illustrate specific embodiments of the described technology and are not intended to be limiting.

DETAILED DESCRIPTION

Figure 1:
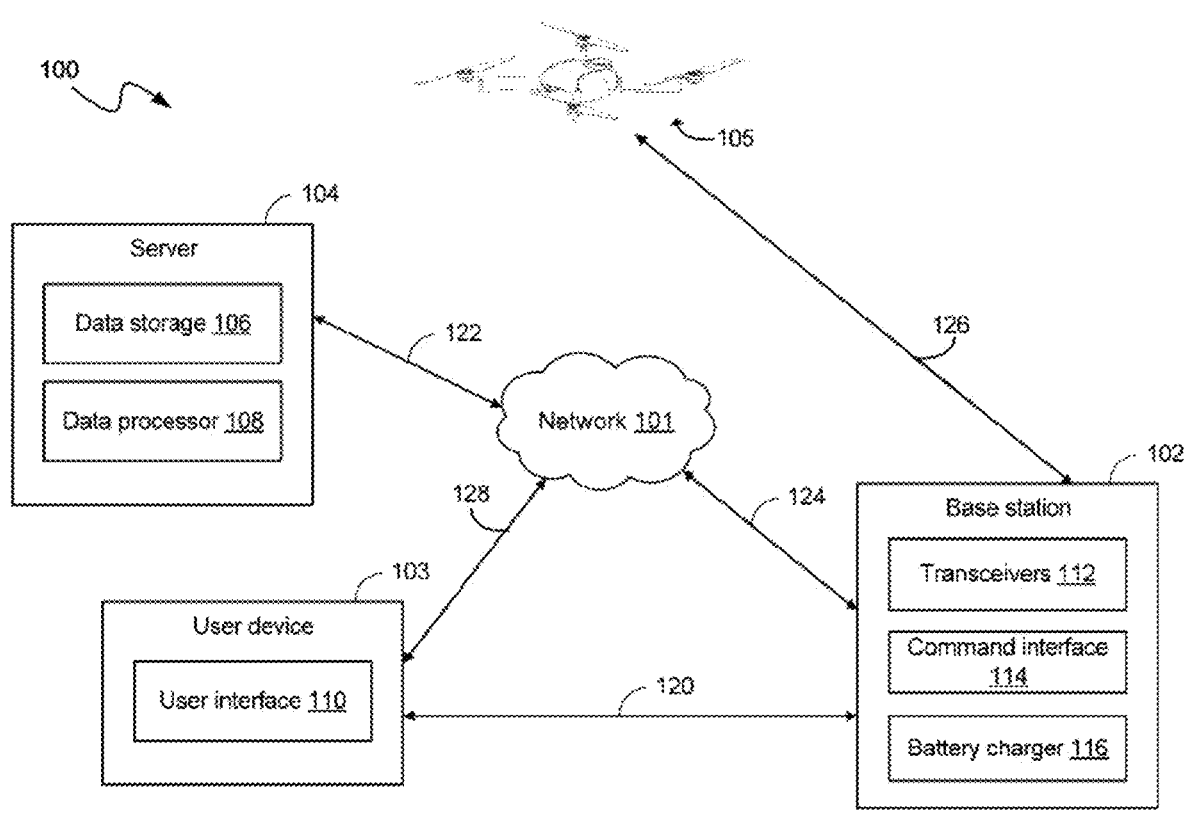
FIG. 1 is a diagram showing an example unmanned aerial vehicle system according to one embodiment.

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass apparatus and/or methods which are practiced using structure and/or functionality in addition to or different than the various aspects set forth herein. It should be understood that any aspect disclosed herein might be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure being defined by the appended claims and equivalents thereof.

The term "unmanned vehicle," as used herein, refers to a vehicle that is configured to operate without an on-board operator (e.g., a driver or pilot). An "unmanned aerial vehicle," or "UA V," as used herein, can denote an unmanned vehicle whose physical operational capabilities include aerial travel or flight. Such a vehicle may be autonomous or semi-autonomous by, for example, executing travel instructions stored in an on-board memory rather than being controlled in real-time manually by wireless commands sent from an operator on the ground. The travel instructions may be executed by one or more on-board processors or microcontrollers that control various components of the unmanned aerial vehicle to control the vehicle's travel along a flight path. The pre-programmed travel instructions may define a mission that the unmanned aerial vehicle performs. Aspects of a mission may include a flight path and instructions to gather a defined set of data during the flight such as photographs or sensor measurements. An unmanned aerial vehicle can be an aircraft that is configured to take off and land on a surface. In some cases, an unmanned aerial vehicle can automatically travel from one location to another without any operator involvement. In some cases, an unmanned aerial vehicle can travel a far distance from a starting point. The distance can be far enough that the unmanned aerial vehicle cannot return to a starting point without refueling or recharging at an intermediate location. An unmanned aerial vehicle can be configured to land on a landing pad and/or charge at a charging station. In some cases, an unmanned aerial vehicle may be programmed to react to an unexpected obstacle in its flight path. If an obstacle is detected, the unmanned aerial vehicle may slow down, stop or change course to try to avoid the obstacle.

An unmanned aerial vehicle can be used to perform missions in an open and/or distant airspace. The missions performed by the unmanned aerial vehicle can be pre-programmed to one or more processors of the unmanned aerial vehicle or can be communicated to the one or more processors during its flight in real time. Furthermore, the unmanned aerial vehicle can be configured to gather and/or store aerial data and/or send the gathered and/or stored aerial data to at least one stationary device forming a communication portal as it performs its missions. Aerial data is data gathered by the unmanned aerial vehicle with sensors during the flight. Aerial data may include what may be referred to as payload data, which means data gathered by the unmanned aerial vehicle regarding its surroundings such as images, video, LIDAR, ultrasound, processed data such as 3D mapping data, or environmental measurements such as gas sensor data. The payload data is typically the information the flight is being performed to collect and deliver to the user. Aerial data also includes what may be termed telemetry data, which is data regarding the status and activities of the unmanned aerial vehicle during the flight such as velocity, position, attitude, temperature, and rotor speeds. Such data may be collected to retain records or logs of flight activity and perform diagnostics.

In some implementations described below, an unmanned aerial vehicle is programmed to react to one or more "mission cues" during its mission.

FIG. 1 is a diagram showing an example unmanned aerial vehicle system according to one embodiment. The illustrated system 100 includes a base station 102, a user device 103, a server 104, and one or more unmanned aerial vehicles 105. The base station 102, the user device 103, and the server 104 can be in communication via a network 101 using communication links 122, 124, 128. The user device 103 and the base station 102 can also be in communication using a local communication link 120, and the base station 102 and the unmanned aerial vehicles 105 can be in communication using one or more aerial vehicle communication links 126. The base station 102 may include transceivers 112, a command interface 114, and a battery charger 116. The server 104 may include a data storage 106 and a data processor 108, and the user device 103 may include a user interface 110. Although the unmanned aerial vehicles 105 illustrated in FIG. 1 are quadcopters each having four arms with their respective rotors, the disclosure herein can be implemented in other types of unmanned aerial vehicles such as a multirotor helicopter having a different number of arms and/or rotors or an aerial vehicle other than a multirotor helicopter such as a fixed wing aerial vehicle. Further details of components of the unmanned aerial vehicles 105 are discussed in connection with FIG. 3 below.

The network 101 can be a global network which may include or comprise the Internet, enabling communication between remotely located devices and servers, and as such the communication links 122, 124, 128 can be implemented using wireless communication technologies currently implemented for mobile telephone and smart phone communications such as Long Term Evolution (LTE) or any other suitable technologies (e.g. GSM, other 3GPP family protocols) generally having throughput data rates of 300 kbps or above. In some embodiments, one or more of the communication links 122, 124, 128 can be implemented using wired communication technologies such as fiber-optic cables or any other suitable technologies providing a similar throughput range as discussed above. Although not illustrated in FIG. 1, the unmanned aerial vehicles 105 may be equipped with communication circuits to interface with network 101 using established mobile telephone network protocols and infrastructures.

The local communication link 120 between the user device 103 and the base station 102 can be implemented, for example, with a local Wi-Fi network (described further below) or any other suitable network generally allowing data rates of 300 kbps or above. In some embodiments, the base station 102 may act as a local network hub such as a Wi-Fi access point, and in other embodiments, the user device 103 may act as a local network hub. In other embodiments, a separate device (not shown) may be used to implement a local network hub.

The aerial vehicle communication link 126 between the base station 102 and one of the unmanned aerial vehicles 105 can be implemented in whole or part with a local communication link using the 900 MHz band (e.g. 902-928 MHz ISM/amateur radio band) or any other suitable link generally having a throughput capacity of less than 300 kbps (kilobits per second) and at least 5 kilometers of range with low (preferably no) packet loss, preferably 10 kilometers of range with low (preferably no) packet loss, and more preferably 60 kilometers of range with low (preferably no) packet loss. The communication link 126 may also be implemented in whole or part, for example, with a local Wi-Fi network link or any other suitable network protocol.

The server 104 can be a remote server configured to, for example, receive, process, and store aerial data collected by the unmanned aerial vehicles 105. The server 104 can receive the aerial data from the base station 102 or the user device 103 or the unmanned aerial vehicle 105 through the network 101 using the communication links 122, 124, 128. Further details of the data communications between the unmanned aerial vehicles 105 and the base station 102 are discussed in connection with FIGS. 2, 3 below. In some embodiments, the server 104 can be implemented with multiple servers in multiple locations, and one or more parts of the server 104 may be distributed and in communication with one another through the network 101. The data storage 106 can be a computer storage device (e.g., hard disk drive (HDD) storage, solid state drive (SSD) storage, or flash memory) to store data received through the network 101. The data processor 108 may be implemented with one or more suitable computer processors capable of processing the data received thought the network 101, such as aerial data from the unmanned aerial vehicles 105.

The base station 102 can be a portable module placed near a take-off point for the flight path of an unmanned aerial vehicle that can collect data from the unmanned aerial vehicles 105. In some embodiments, the base station 102 may also act as a hub to the local network between the unmanned aerial vehicles 105 and the user device 103. The base station 102 can include transceivers 112 and a command interface 114. The transceivers 112 can be devices capable of transmitting and receiving data to and from a system, device, or module external to the unmanned aerial vehicle. For example, the transceivers 112 may include radio frequency (RF) transceivers capable of communicating data over a Wi-Fi network, LTE network, or any other suitable network in various frequency bands or channels, such as 900 MHz, 2.4 GHz, 5 GHz, etc. In some embodiments, the transceivers 112 may be implemented with a combination of separate transmitters and receivers. The command interface 114 can be an interface configured to receive user command inputs, and the battery charger 116 can be configured to receive or connect to one or more batteries of the unmanned aerial vehicles 105.

The user device 103 can be a portable user device, such as a tablet computer, smart phone, or laptop computer capable of receiving user inputs and transmitting user input data to the base station 102 to affect the operation of the unmanned aerial vehicle. For example, the user input data may include commands or flight plan changes, and the user device 103 may send the commands to the base station 102 using the local communication link 120. In some embodiments, the user input data may include a designated area of interest for the unmanned aerial vehicle 105 to observe and gather relevant aerial data. In some embodiments, the user input data may include specific areas to avoid when the unmanned aerial vehicle 105 is performing its mission. The base station 102 can process and/or send the commands received from the user device 103 to the unmanned aerial vehicles 105 using one of the aerial vehicle communication links 126.

The user device 103 may also be configured to allow user access to the data stored in the data storage 106 of the server 104. The user device 103 may further include a transceiver (not shown), a processor (not shown), a display (not shown), and a user input means (not shown) to allow user interaction and transmitting, receiving, and processing of data. In some embodiments, the data processor 108 may transform received data for a presentment to a user of the user device 103. For example, the received aerial data may include aerial images of a selected location taken every day, and the data processor 108 may process the daily images to generate a construction or landscape progress report. The processed data can be further accessed by the user device 103 through the network 101 using the communication link 128, and the user may navigate, manipulate, and edit the processed data using the user interface 110. In some embodiments, the processing of the received data may be performed in part or in all with the user device 103. In the abovementioned example, the user device 103 may receive raw or partially processed aerial image data, and a processor (not shown) associated with the user device 103 may further process the image data for user presentation, manipulation, and editing.

Figure 2:
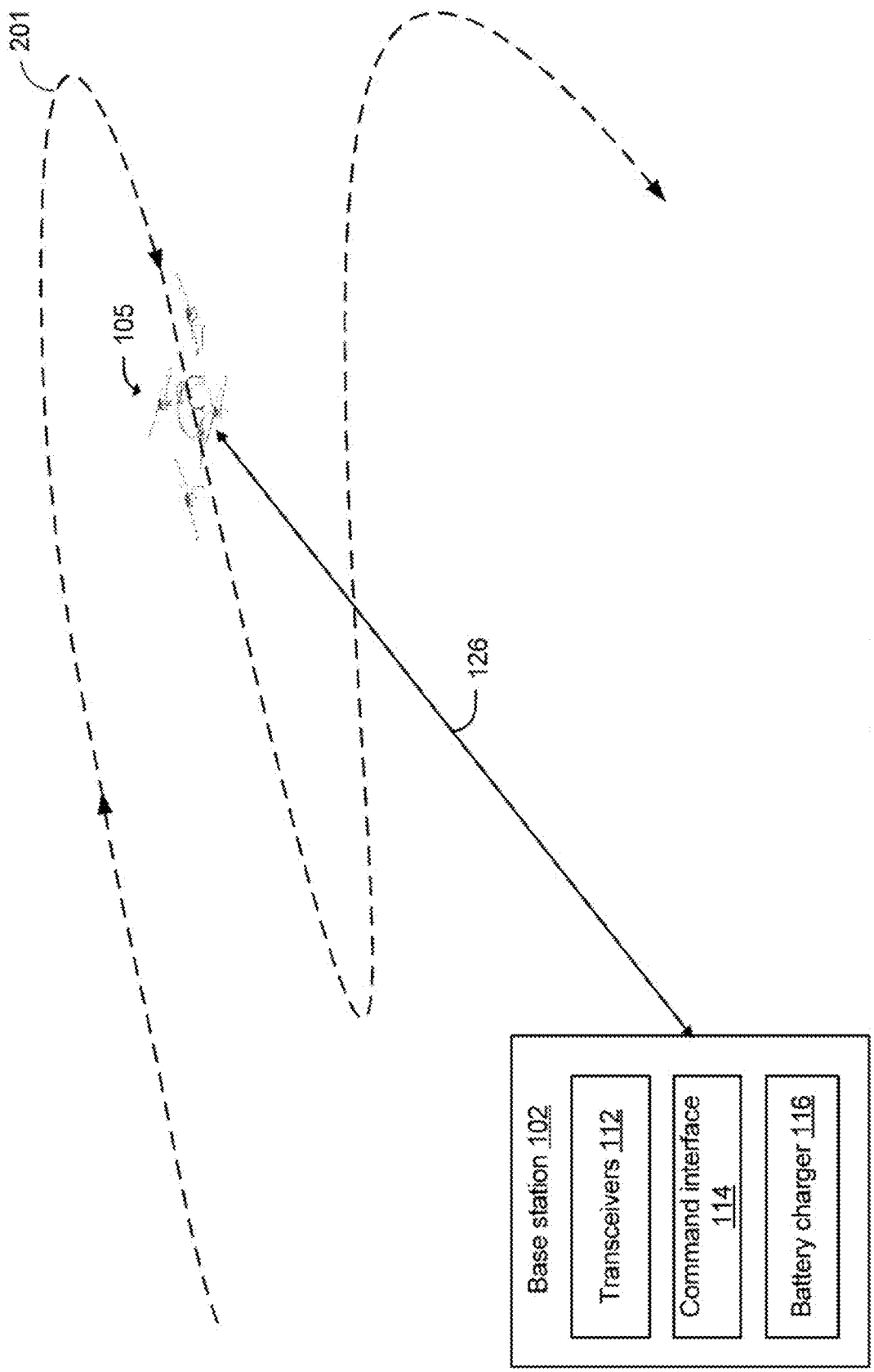
FIG. 2 is an illustration of a flight path of an unmanned aerial vehicle in the system of FIG. 1.

The illustration in FIG. 2 includes the unmanned aerial vehicle 105, a flight path 201, and aerial vehicle communication link 126. In the course of executing a mission, the unmanned aerial vehicle 105a may fly according to the flight path 201. In some embodiments, the flight path 201 can be determined based on the mission, known obstacles, or other surroundings. For example, the flight path 201 can be in a right-angled serpentine shape for a mission to take aerial photos of an open rectangular field. In some embodiments, the flight path 201 may be predetermined and sent to the unmanned aerial vehicle 105 before its flight begins. The flight path is defined by travel instructions that are executed by the unmanned aerial vehicle during the mission.

Figure 3:
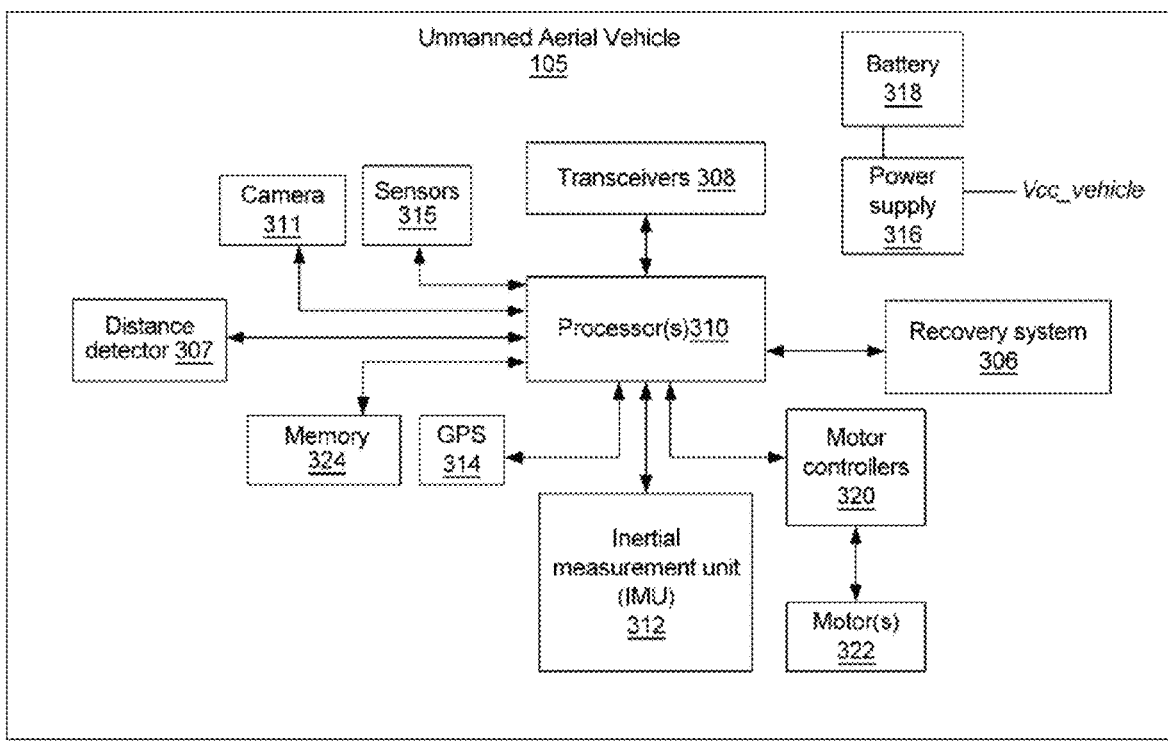
FIG. 3 is a block diagram of components of an unmanned aerial vehicle according to one embodiment.

FIG. 3 is a diagram showing components of an example unmanned aerial vehicle according to one embodiment. The vehicle 105 illustrated in FIG. 3 includes one or more processor(s) 310 in communication with a state estimator which may be an inertial measurement unit (IMU) 312. The processor 310 is in further communication with one or more transceivers 308, sensors 315, a distance detector 307, a camera 311, a global positioning system (GPS) module 314, memory 324, and motor controllers 320, which are in communication with motors 322. The vehicle 105 further includes a power supply 316 and a battery 318, which provides power to one or more modules of the vehicle 105, including the processor 310. The transceivers 308 and the GPS module 314 may be in further communication with their respective antennas (not shown). The memory 324 may store one or more of mission instructions, travel instructions, pre-mission routines, payload data, flight data and/or telemetry, settings, parameters, or other similarly relevant information or data. The vehicle 105 may also include a recovery system 306, which may be in communication with one or more components in the vehicle 105, including the processor 310. The vehicle 105 may include additional or intermediate components, modules, drivers, controllers, circuitries, lines of communication, and/or signals not illustrated in FIG. 3.

The vehicle 105 can perform its regular operation according to instructions executed by the processor 310 to, for example, take a course of action for a mission. The processor 310 can be a microprocessor capable of communicating with various modules illustrated in FIG. 3 executing instructions pre-programmed and/or received during a mission, for example. The processor 310 may receive instructions, settings, values, or parameters stored in the memory 324 and data from the sensors 315, the distance detector 307, the camera 311, the transceivers 308, the GPS module 314, the IMU 312, and the motor controllers 320 to evaluate the status of the vehicle 101 and determine a course of action. The status of the vehicle 105 can be determined based on data received through the sensors 315, the distance detector 307, and/or preloaded data stored in the memory 324 and accessed by the processor 310. For example, the altitude of the vehicle 105 above ground can be determined by the processor 310 based on a digital elevation model (DEM) of a world elevation map or with the distance detector 307 (e.g., a LIDAR), a barometer, or ultrasound. In some embodiments, the vehicle 105 may include multiple processors of varying levels of computing power and reliability to execute low-level instructions or run high-level application code or a virtual machine. In such embodiments, one or more of the functionalities of the processor(s) 310 described herein may instead be performed by another processor in the vehicle 105.

The transceivers 308 can be devices capable of transmitting and receiving data to and from a system, device, or module external to the vehicle 105. For example, the transceivers 308 may include radio frequency (RF) transceivers capable of communicating data over a Wi-Fi network or any other suitable network in various frequency bands or channels, such as 900 MHz, 2.4 GHz, 5 GHz, etc. In some embodiments, the transceivers 308 may be implemented with a combination of separate transmitters and receivers. The motor controllers 320 may include a controller device or circuit configured to interface between the processor 310 and the motors 322 for regulating and controlling speed, velocity, torque, or other operational parameters of their respective, coupled motors 322. In some embodiments, one or more motor control schemes, such as a feedback control loop, may be implemented with the processor 310 and/or the motor controllers 320. The motors 322 may include electrical or any other suitable motors coupled to their respective rotors of the vehicle 105 to control their propellers, for example.

The memory 324 can be a memory storage device (e.g., random-access memory, read-only memory, flash memory, or solid state drive (SSD) storage) to store data collected from the sensors 315, the camera 311, data processed in the processor 310, or preloaded data, parameters, or instructions. In some embodiments, the memory 324 may store data gathered from the distance detector 307 using various computationally efficient data structures. For example, in some cases, the distance data from the distance detector 307 can be stored using a three-dimensional occupancy grid mapping, with the gathered data grouped into cube-shaped bins of variable resolution in space. Depending on the need of distance data for the various processes or operations described herein using distance data, the resolution of the occupancy grid can be determined to indicate whether each variable resolution bin within the reach of the distance detector is free or occupied based on the gathered distance data. In some embodiments, the three-dimensional occupancy mapping values can be estimated using probabilistic approaches based on the gathered distance data. Furthermore, such three-dimensional occupancy grid mapping can aid or be part of the dynamic or adaptive topology based data gathering as disclosed herein.

The IMU 312 may include a stand-alone IMU chip containing one or more magnetometers, gyroscopes, accelerometers, and/or barometers. In some embodiments, the IMU 312 may be implemented using a combination of multiple chips or modules configured to perform, for example, measuring of magnetic fields and vehicle orientation and acceleration and to generate related data for further processing with the processor 310. Regardless of integrated or multi-module implementation of the IMU 312, the term "magnetometer" as used herein, generally refers to the part(s) of the IMU 312 responsible for measuring the magnetic field at the location of the vehicle 105. Similarly, the term "accelerometer" as used herein, generally refers to the part(s) of the IMU 312 responsible for measuring acceleration of the vehicle 105, and the term "gyroscope" as used herein, generally refers to the part(s) of the IMU 312 responsible for measuring orientation of the vehicle 105.

The recovery system 306 can be responsible for recovery operation of the vehicle 101 to, for example, safely deploy a parachute and land the vehicle 105. The recovery system 306 may include a parachute (not shown) and an electromechanical deployment mechanism (not shown). The power supply 316 may include circuitry such as voltage regulators with outputs directly powering various modules of the vehicle 105 with Vee_vehicle, and the battery 318 can provide power to the power supply 316. In some embodiments, the battery 318 can be a multi-cell lithium battery or any other suitable battery capable of powering the vehicle 105. In some embodiments, the battery 318 of the vehicle 105 can be removable for easy swapping and charging.

The sensors 315 may include one or more proximity sensors using, for example, infrared, radar, sonar, ultrasound, LIDAR, barometer, and/or optical technology. The sensors 315 may also include other types of sensors gathering data regarding visual fields, auditory signals, and/or environmental conditions (e.g., temperature, humidity, pressure, etc.). The GPS module 314 may include a GPS transceiver and/or a GPS driver configured to receive raw and/or processed GPS data such as ephemerides for further processing within the GPS module 314, with the processor 310, or both. The vehicle 105 may also include a microphone (not shown) to gather audio data. In some embodiments, one or more sensors 315 responsible for gathering data regarding auditory signals can take the place of the microphone.

The distance detector 307 can include a LIDAR sensor, such as a one-, two-, or three-dimensional LIDAR sensor. In some embodiments, the distance detector 307 can be accompanied by one or more support structures or mechanical mechanisms for improving, augmenting, or enhancing its detectability. Also, in some embodiments, the distance detector 307 can be mounted on a strategic location of the vehicle 101 for ease of detection and control.

The camera 311 can be configured to gather images and/or video. In some embodiments, one or more of the sensors 315 and the distance detector 307 responsible for gathering data regarding visual fields can take the place of the camera 311. In some embodiments, the sensors 315, the distance detector 307, and/or the camera 311 may be configured to gather parts of payload data, which includes data gathered by the vehicle 105 regarding its surroundings, such as images, video, and/or processed 3D mapping data, gathered for purposes of mission performance and/or delivered to the user for various purposes such as surveillance, inspection, monitoring, observation, progress report, landscape analysis, etc. The sensors 315 may also gather what may be termed telemetry data, which is data regarding the status and activities of the vehicle 105 during the flight such as velocity, position, attitude, temperature, and rotor speeds. Such data may be collected to retain records or logs of flight activity and perform diagnostics. In some embodiments, the sensors 315, the distance detector 307, and/or the camera 311 may also be configured to gather data for purposes of aiding navigation and obstruction detection.

Figure 4:
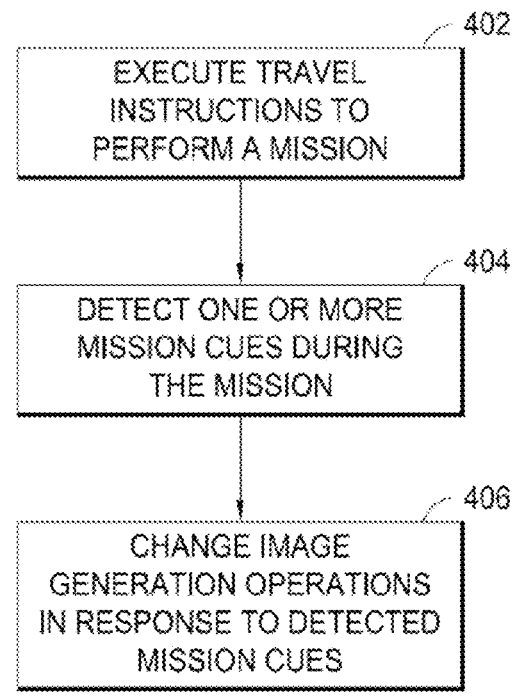
FIG. 4 is a flowchart of an example mission cue dependent data gathering protocol of an unmanned aerial vehicle.

FIG. 4 is a flowchart of an example data gathering of an unmanned aerial vehicle. The illustrated process 400 can be performed in part by and/or in conjunction with one or more components in the vehicle 105 (FIG. 3), such as the processor(s) 310 (FIG. 3), the distance detector 307 (FIG. 3), the sensors 315 (FIG. 3), the camera 311 (FIG. 3), the memory 324 (FIG. 3), the GPS module 314 (FIG. 3), the IMU 312 (FIG. 3), and the motor controllers 320 (FIG. 3). It is to be noted that all or parts of steps 402, 404, and 406 may be concurrently, continuously, periodically, intermittently, repeatedly, or iteratively performed, and the illustrated process in FIG. 4 is only one example embodiment of inventive features disclosed herein.

In step 402, the unmanned aerial vehicle 105 executes travel instructions to perform a mission. In some embodiments, the mission or part of the mission may be to gather images of a predefined area to generate a two- and/or three-dimensional map. In other instances, the mission may involve gathering and generating other types of data pertaining to the physical characteristics of the objects or structures the unmanned aerial vehicle 105 flies over or around, such as identifying certain objects or interest and determining physical conditions of the objects of interest.

In step 404, using various components described in connection with FIG. 3 above, the unmanned aerial vehicle 105 may detect what are referred to herein as "mission cues." A mission cue is one or more pre-defined image data characteristics and/or sensor data characteristics. The unmanned aerial vehicle may compare images and/or data received during the mission to the stored mission cues. The stored mission cues allow the unmanned aerial vehicle to react to the content of images and/or sensor data during the mission. For example, a pre-defined image characteristic may correspond to an image characteristic that is exhibited by images of a pre-defined object and/or a pre-defined object with a pre-defined condition. An pre-defined object may be, as explained in the examples below, a storm damaged roof, or a truss joint. It may also be a characteristic of the environment such as the topology of the area the unmanned aerial vehicle is flying over.

In the topology example, the unmanned aerial vehicle 105 may gather distance data of its surroundings at a default rate using the distance detector 307 to determine if certain physical conditions are present that indicate the nature of the local topology or changes in the local topology. For instance, a wall of a tall building may result in a quick change in distance from the vehicle 105 to its surroundings, and a pile of sand can result in a gradual smooth change in distance from the vehicle 105 to its surroundings.

In step 406, the unmanned aerial vehicle 101 may adjust its data gathering such as image generation operations if a significant or otherwise meaningful change in topology is detected. In some embodiments, the adjustment in data gathering can be gradual, and in other embodiments, the adjustment of data gathering can be bimodal or discrete. In some embodiments, the adjustment of data gathering can be based on identification of the object or structures based on the topology determination. For instance, the unmanned aerial vehicle 105 may be configured to double its rate of data gathering when it encounters a building while it can be configured to triple the rate when it approaches a pile of rocks. Also, in some embodiments, the adjustment in data gathering my further involve adjusting the flying speed, for example, to allow more time for data gathering. In some embodiments, the dynamic adjustment of data gathering can be only partially implemented to balance the adaptability of the data gathering system and simplicity in implementation.

Figure 5:
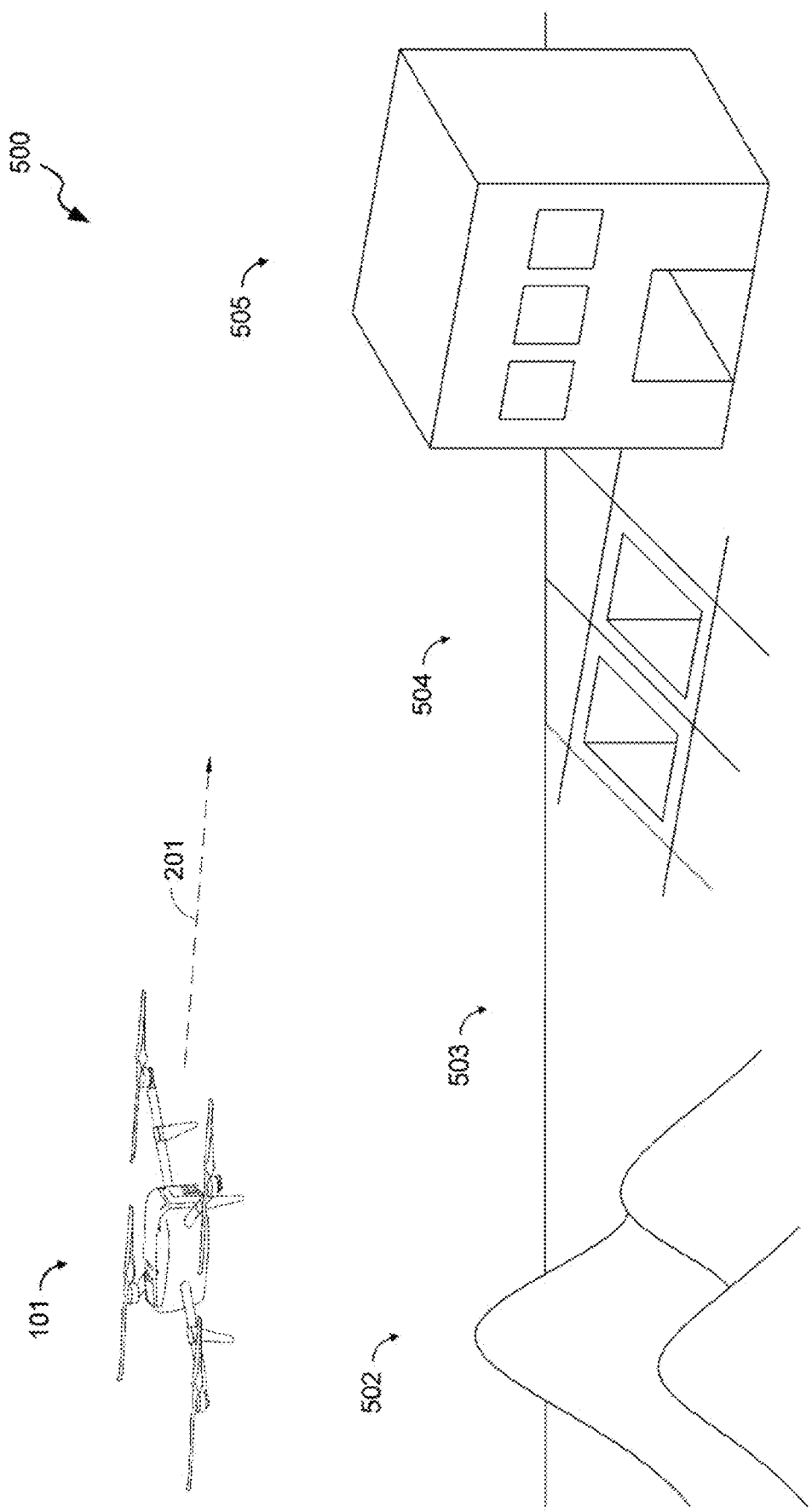
FIG. 5 is an illustration of an example of an unmanned aerial vehicle in operation according to one embodiment.

FIG. 5 is an illustration of an example of an unmanned aerial vehicle in operation according to one embodiment of the topology related mission cue example. The illustrated scene 500 in FIG. 5 shows an unmanned aerial vehicle 105 executing instructions to follow a flight path 201 over one or more areas having various physical conditions including one or more piles of objects 502, an inconspicuous or unoccupied space 503, a below-ground structure 504, and an above-ground structure 505. It is to be noted that the items depicted in FIG. 5 are not to scale. The piles of objects 502 can be, for example, a pile of rocks, sand, minerals, etc. that can be useful, collected, or discarded materials and that often exist near or at sites of construction, excavation, or other similar terrestrial operations, developments, or projects. The unoccupied space 503 can be a relatively flat area having a relatively little change of altitude and/or slow rate of change of altitude (e.g., smooth), for example, such as a flat desert-like area, a meadow, a field on a mildly rolling hill, a pre-construction empty lot, and the like, from which much data need not be gathered for the purpose of the mission performed by the unmanned aerial vehicle 105. The below-ground structure 504, can be an, such as a well, a tunnel, an excavation hole, and the like, or a below-ground condition created at least in part naturally. The above-ground structure 505 can be an artificial or man-made above-ground structure, such as a building, a house, a tower, a bridge, an antenna, etc., or an above-ground condition created at least in part naturally.

One of various types of missions performed by the unmanned aerial vehicle 105 can be payload data gathering, payload data including images (two- or three-dimensional), sounds, video, and other characteristic data of one or more objects, structures, or attendant conditions within an area covered by the mission. For example, the unmanned aerial vehicle 105 can be assigned to collect payload data in the illustrated scene 500 to generate a three-dimensional image of an area in the scene 500. As the unmanned aerial vehicle 105 flies over the piles of objects 502, the unoccupied space 503, the below-ground structure 504, and the above-ground structure 505, the unmanned aerial vehicle 105 can adjust its rate of data gathering based on the physical characteristics or the topology of the scene 500. For instance, the unmanned aerial vehicle 105, for example can determine that it is approaching the above-ground structure 505 (e.g., building) using its distance detector using technologies such as LIDAR. As the unmanned aerial vehicle 105 approaches the above-ground structure 505, the unmanned aerial vehicle 105 may scale up the rate at which it receives, processes, and/or generates data (e.g., acquiring photographic images) pertaining to the above-ground structure 505. As the unmanned aerial vehicle 105 flies over the above-ground structure 505, the unmanned aerial vehicle 105 may gather aerial data at the ramped up or higher than average rate, and as the unmanned aerial vehicle 105 determines that it is moving away from the above-ground structure 505, the unmanned aerial vehicle 105 can scale down the rate of data gathering. Similarly, in other embodiments, the unmanned aerial vehicle 105 can otherwise enhance its payload data gathering activity as it flies over the above-ground structure 505. For example, the unmanned aerial vehicle 105, in response to encountering the above-ground structure 505, can slow down its flying speed and/or hover over and around the above-ground structure 505 to gather more payload data. In another instance, the unmanned aerial vehicle 105 during its mission may fly toward the unoccupied space 503, and gathering lots of data on the unoccupied space 503 may not be necessary. As the unmanned aerial vehicle 105 takes in image data and/or gathers distance data, it can determine that it is approaching an empty lot, for example, and reduce the rate of data gathering.

The rate of data gathering and processing can be varied further depending on additional factors. For example, in some embodiments, the unmanned aerial vehicle 105 may determine based on the detected topology, that the object or the surrounding it is approaching is not of interest to the mission it is performing. In some missions, for example, detailed information pertaining to only buildings of a certain size or above is relevant, and accordingly, the unmanned aerial vehicle 105 may not increase its rate of data gathering when it determines it is approaching a small house. Similarly, in some missions, detailed information pertaining to only piles of rocks may be relevant, and the unmanned aerial vehicle 105 performing those missions may not increase its rate of data gathering as it approaches to a building. In other embodiments, the relevance of an object or surroundings can be a matter of degree such that the rate of data gathering can be increased or decreased based on the varying degrees or levels of interest in a mission. In yet another embodiments, the unmanned aerial vehicle 105 may have one or more default modes of data gathering depending on generic features, such as size, height, volume, etc., of the one or more objects or terrestrial conditions it is approaching and/or flying over. In such embodiments, particular determination of the object or condition (e.g., building vs. pile of rocks) may be only partially performed or wholly omitted.

For example, in some embodiments, the unmanned aerial vehicle 105 may determine as part of the topology determination as described herein, the shortest distance (Euclidian) between itself and the closest point on the surface of a terrestrial structure or condition. In such embodiments, the shortest distance being below a threshold, for example, may trigger the unmanned aerial vehicle 105 to ramp up the rate of payload data gathering (e.g., image taking) as the short distance may signify the terrestrial structure or condition be closer to the unmanned aerial vehicle 105 and higher from the ground than otherwise. In another example, as part of the topology determination, the unmanned aerial vehicle 105 may determine the rate of change in the shortest distance between itself and the terrestrial structure or condition. In this example, the rate of change being higher than a threshold may trigger the unmanned aerial vehicle 105 to ramp up the rate of payload data gathering as such rate of change in the shortest distance may indicate the unmanned aerial vehicle 105 approaching the structure or condition fast. In yet another example, as part of the topology determination, the unmanned aerial vehicle 105 may determine the height of the terrestrial structure (e.g., building) from a reference level (e.g., ground, sea level, etc.). In this example the height of the structure being higher than a threshold can trigger the unmanned aerial vehicle 105 to ramp up the rate of payload data gathering. In yet another example, the unmanned aerial vehicle 105 may, as part of the topology determination, identify a particular structure or particular type of structure, object, or features of interest. In such instances, the unmanned aerial vehicle 105 may ramp up the rate of payload data gathering regarding the particular structure, object, or features of interest regardless of the distance, approaching speed, or height of the structure, object, or features. In this example image data, including the payload data themselves, can be used for the identification in conjunction with other sensor data (e.g. distance data). In all these examples, the payload data gathering ramp up can be replaced with or employed in conjunction with slowing down the vehicle 105 itself.

Conversely, in other instances, the unmanned aerial vehicle 105 may determine as part of the topology determination that the particular area that it is about to fly over is not conspicuous or mostly empty. In some embodiments the unmanned aerial vehicle 105 may have a default rate of payload data collection, and when encountered with a particularly inconspicuous segment of a flight, the unmanned aerial vehicle 105 may ramp down the rate of payload data collection. In these converse examples, the payload data gathering ramp down can be replaced with or employed in conjunction with speeding up the vehicle 105 itself.

When the unmanned aerial vehicle 105 determines the relevant topology as disclosed herein, the one or more processors in the vehicle 105 may generate an instruction to adjust the payload data gathering accordingly (e.g., ramp up, ramp down) and/or adjust the speed of the vehicle 105 (e.g., slow down, speed up). As described herein, the data gathering can be dynamically adjusted based on the objects or surroundings the unmanned aerial vehicle 105 encounters during its mission. In some embodiments, parts or all of the process of data gathering (sensing, sampling, processing, storing, etc.) can be dynamically adjusted to, for example, reduce complexity in some parts of data gathering (e.g., keeping the sensors constantly on for simplicity) while adjusting other parts of data gathering (e.g., dynamically adjusting the sampling rate according to the topology of the ground object). Adjusting data gathering based on topology as disclosed herein can be advantageous because it allows gathering detailed data on objects or surroundings of complicated topology while reducing relatively less important or redundant data gathering on simple or inconspicuous surroundings. The dynamic adjustment in data gathering allows reducing of overall data, which can be beneficial for storage and data transfer purposes without much, if any, compromise in the quality of overall data gathered for the mission.

Furthermore, it can be advantageous to, for example, take in more payload data such as pictures of a big structure, such as a tall building, to ameliorate potential loss of or variations in resolution due to the close or varying distance of the building (especially the top portions of the building) to the flight path of the unmanned aerial vehicle 105. In other instances, it can be advantageous to gather additional data due to the complex, unpredictable, or unique nature of certain structures or objects (e.g., statues, bridges, towers, random piles of objects, etc.) in the three-dimensional space below the flight path of the unmanned vehicle 105. On the contrary, if the space below the unmanned aerial vehicle 105 is relatively flat, empty, or otherwise inconspicuous or predictable, not much data of the space may be necessary and gathering data at a relatively low rate allows the unmanned aerial vehicle 105 to save power, memory, storage capacity, and data transmission bandwidth in its operation. In such case, the unmanned aerial vehicle 105 can be configured to take, for example, the least number of pictures of the area that will allow generation of a three-dimensional map without more. For instance, depending on the implementation of the disclosed herein, the volume of data transfer can be reduced by 50% while maintaining the overall resolution or quality of a map generated from the images taken by the unmanned aerial vehicle 105.

As discussed above, one or more of the sensors 315, the camera 311, and the distance detector 307 can be configured to receive, process, and/or generate data at a dynamic or adaptive rate in response to the physical characteristics of the object or field of interest, such as the topology of a designated area. For instance, the distance detector 307 of the unmanned aerial vehicle 105 can detect that the vehicle 105 is approaching a building (e.g. the above-ground structure 505 in FIG. 5), which is of interest to the mission, and the camera 311 may gradually increase the rate at which the camera 311 takes pictures of the building. The unmanned aerial vehicle 105 can further adjust the speed of the flight through the motor controllers 320, for example, over and around the building to allow more pictures to be taken by the camera 311. The rate of data gathering per unit of travel distance can thus be altered by altering image capture rate or vehicle 105 speed.

Figure 6:
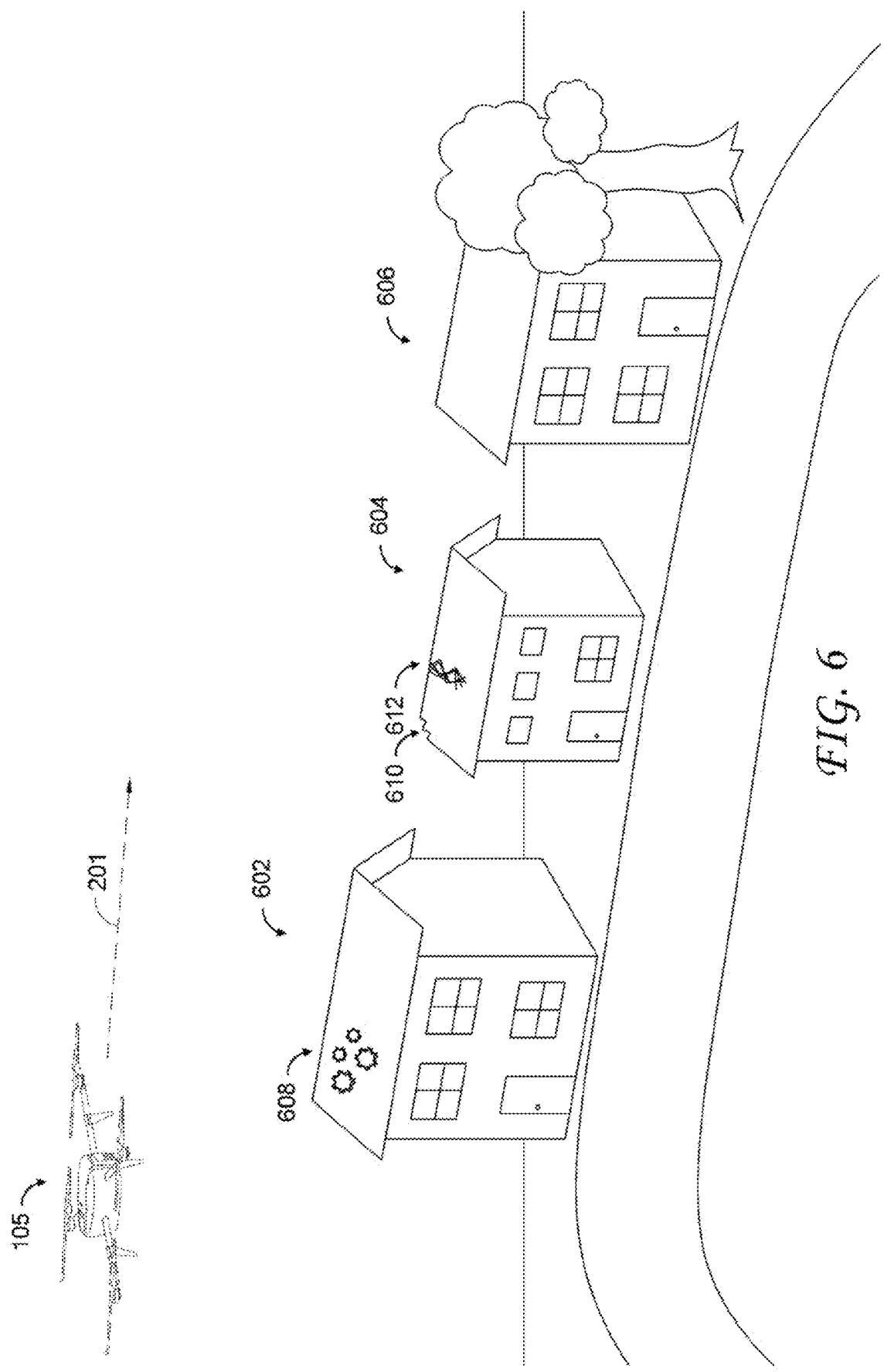
FIG. 6 is an illustration of another example of an unmanned aerial vehicle in operation according to one embodiment.

FIG. 6 illustrates another use of an unmanned aerial vehicle where the above described changes in image generation can be useful. In FIG. 6, the unmanned aerial vehicle 105 is flying over a series of houses 402,404, and 406, perhaps surveying roof damage after a storm. As it follows flight path 201, it may do one or more of increase the rate of image generation, slow down the vehicle 105 speed, or temporarily increase the resolution of the images being acquired by the vehicle 105 if it detects an indication of roof damage such as 408, 410, and 412 in FIG. 6 in an acquired image. This may be detected, for example with image processing techniques such as edge detection, thresholding, and the like that can indicate if a roof in an image is smooth with little color change over its surface, indicating an undamaged roof or if it includes sharp edges and varying colors indicating a damaged roof.

It can also be advantageous in addition to or as an alternative to modifying the image generation operations to change the flight path of the unmanned aerial vehicle in response to mission cues. As described below, this can be implemented in a manner that does not require excessive processing power or complex instruction programming. In general, such a method may follow the acts set forth in FIG. 7. In block 704, the unmanned aerial vehicle 105 executes first travel instructions to perform an overall mission. For example, the overall mission may be to follow a flight path above the houses 602, 604, 606 of FIG. 6. In block 706, the unmanned aerial vehicle 105 detects one or more mission cues as it performs the overall mission. In the context of FIG. 6, a mission cue may an image processing output that indicates a damaged roof below.

In block 708, in response to detecting the mission cue, the first travel instruction execution is interrupted, and the unmanned aerial vehicle executes second travel instructions to perform a "sub-mission" of the overall mission. The sub-mission may, as illustrated in the examples below, be directed to gathering additional payload data associated with the area that produced the detected mission cue. In block 710, after executing the second travel instructions, the unmanned aerial vehicle returns to executing the first travel instructions to continue with the overall mission. In the FIG. 6 context, the unmanned aerial vehicle my drop down closer to the damaged roof, take pictures with the camera from a closer vantage point, and then ascend back up to the flight path defined by the first travel instructions.

Figure 7:
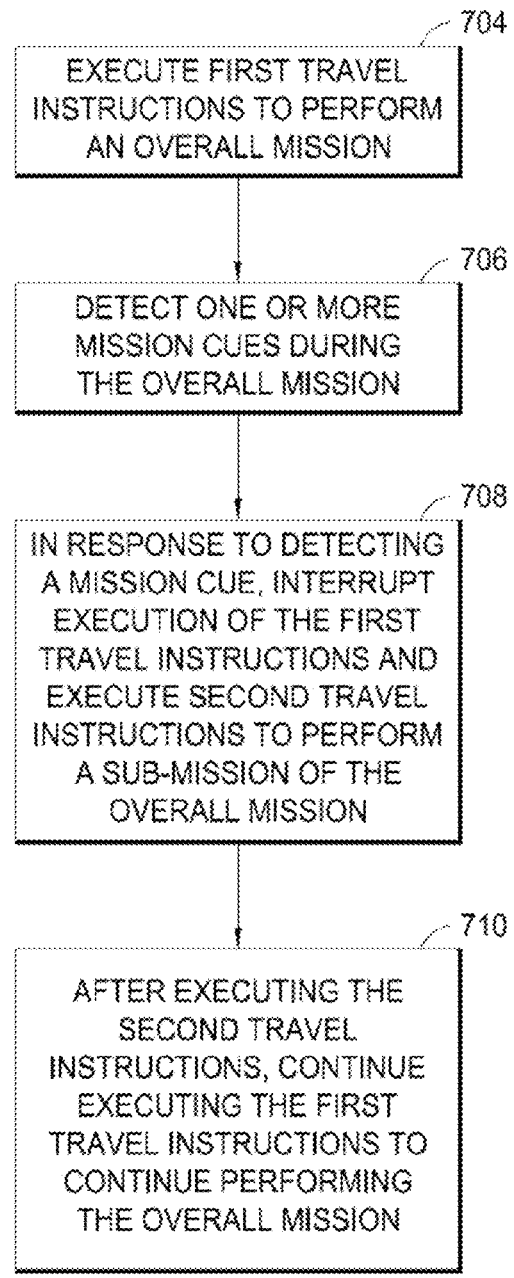
FIG. 7 is a flowchart of an example mission cue dependent flight path protocol of an unmanned aerial vehicle.
Figure 8:
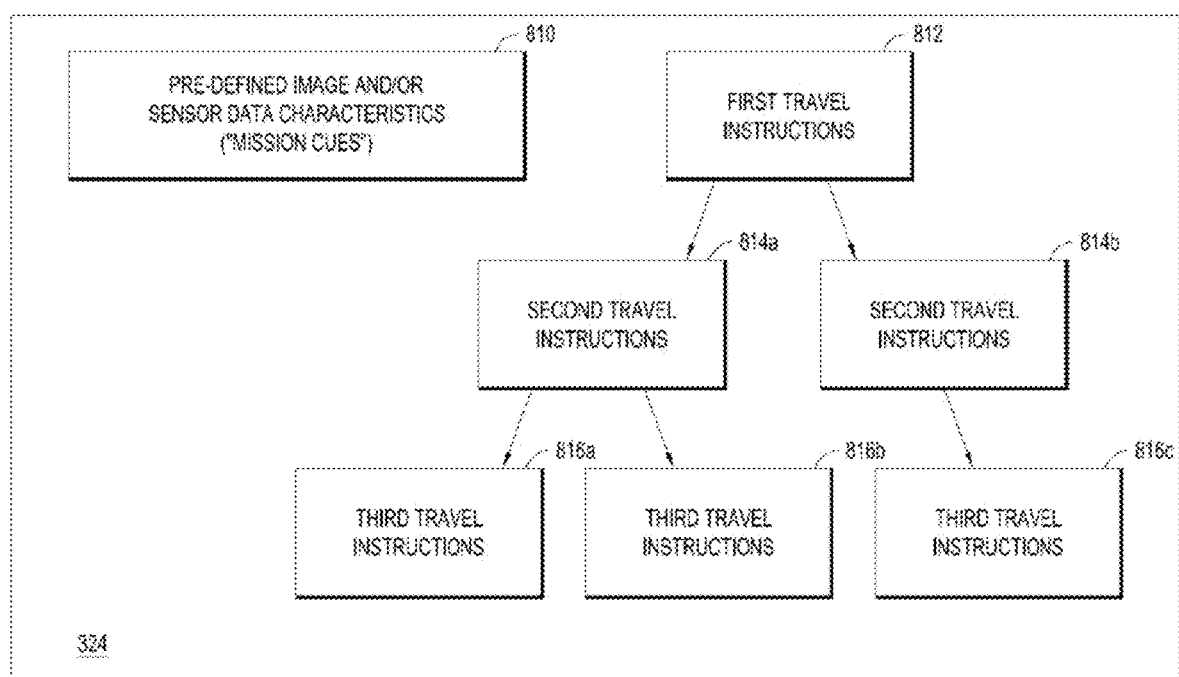
FIG. 8 is an implementation of the content of the memory of FIG. 3 in one embodiment.

FIG. 8 is a diagram representing the content of memory (e.g. memory 324) which may store the instructions and mission cues to implement the method illustrated in FIG. 7. Stored in memory 324 are one or more mission cues 810. Also stored in memory 24 are first travel instructions 812 that define an overall mission for the unmanned aerial vehicle. The first travel instructions may include instructions regarding gathering payload data and processing that payload data to detect mission cues. The first travel instructions may also specify that if a mission cue is detected, second travel instructions such as second travel instructions 814*a* are called or accessed to be run by the processor 310 rather than continuing with the first travel instructions. The second travel instructions define a sub-mission of the overall mission. As shown in FIG. 8, the first travel instructions may have available two or more different second instructions, such that, for example, depending on which mission cue is detected, a different sub-mission may be performed. As also shown in FIG. 8, this scheme can be continued in a nested manner, where the second program instructions may access third travel instructions 816 in response to detecting a mission cue, which may be the same or a different mission cue that caused the first program instructions to call the second program instructions.

FIG. 8 is a diagram representing the content of memory (e.g. memory 324) which may store the instructions and mission cues to implement the method illustrated in FIG. 7. Stored in memory 324 are one or more mission cues 810. Also stored in memory 24 are first travel instructions 812 that define an overall mission for the unmanned aerial vehicle. The first travel instructions may include instructions regarding gathering payload data and processing that payload data to detect mission cues. The first travel instructions may also specify that if a mission cue is detected, second travel instructions such as second travel instructions 814*a* are called or accessed to be run by the processor 310 rather than continuing with the first travel instructions. The second travel instructions define a sub-mission of the overall mission. As shown in FIG. 8, the first travel instructions may have available two or more different second instructions, such that, for example, depending on which mission cue is detected, a different sub-mission may be performed. As also shown in FIG. 8, this scheme can be continued in a nested manner, where the second program instructions may access third travel instructions 816 in response to detecting a mission cue, which may be the same or a different mission cue that caused the first program instructions to call the second program instructions.

Figure 9:
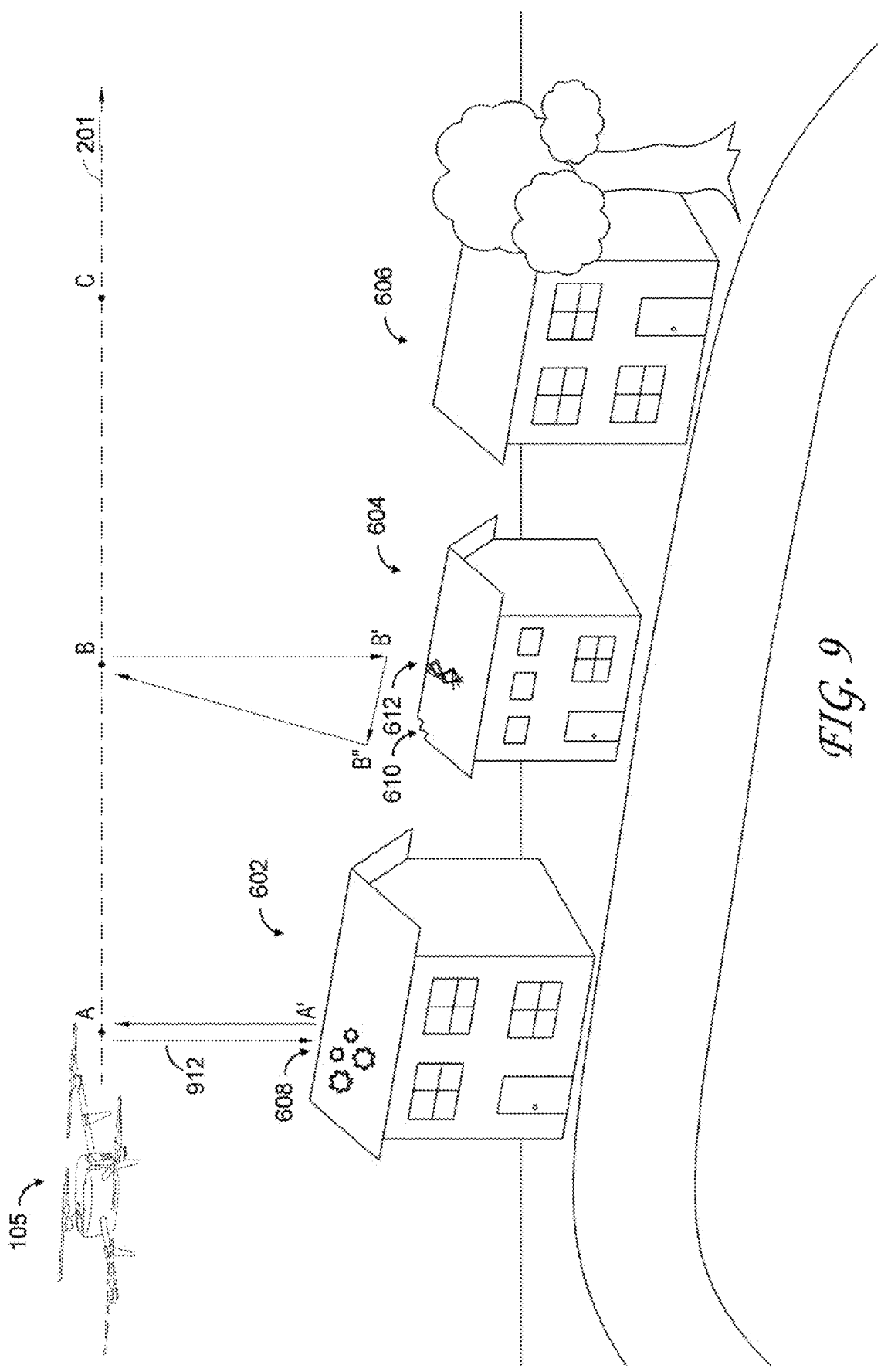
FIG. 9 is a diagram showing an unmanned aerial vehicle executing an overall mission and one or more sub-missions of the overall mission.

FIG. 9 is an illustration of how this process may be implemented in the context of the house roof inspections of FIG. 6. The flight path 201 is part of the overall mission and is performed by executing at least some of the first instructions. This flight path includes points A, B, and C along it. The unmanned aerial vehicle 105 may be programmed as part of the overall mission to stop and hover at these points to acquire an image for processing to determine the presence or absence of a mission cue, or it may be programmed to acquire images as it moves through these points and process images for mission cues on the fly. When the unmanned aerial vehicle reaches point A, it detects in an acquired image a mission cue indicating a damaged roof When the mission cue is detected, the processor 310 stops executing the first instructions and branches to a set of second instructions. As shown in FIG. 9 at 912, the second instructions may command the unmanned aerial vehicle to descend to point A', take one or more additional images, and then return to point A along the flight path 201. When these second instructions are completed, the processor returns to executing the first set of instructions, and continues traveling along flight path 201. The point A' can be defined in many ways. Because the unmanned aerial vehicle has information about the direction the camera is pointing, the location in the image that caused the mission cue can be determined, and this can define the direction to point A'. The distance to point A' can be defined, for example, as a fixed descent amount that is known not to impact any roofs during the overall mission, or as a descent to a defined height above the roof of house 602 as measured by an on-board LIDAR for example. If the unmanned aerial vehicle has a stereo camera, the distance to the roof can be computed from the pair of images, and a descent amount can be calculated to use when executing the second instructions. Depending on the application, a new GPS coordinate to travel to can be derived from the image and made part of the second travel instructions.

When the unmanned aerial vehicle reaches point B, mission cue induced branching to a set of second instructions may cause the unmanned aerial vehicle to travel from point B to point B' and take one or more images, and then move from point B' to point B" and take one or more images, and then return to point B. This path is more complex, and generating second instructions to follow it would also be more complex. It may be advantageous to use the simplest second instructions (and third instructions) as possible, so the unmanned aerial vehicle does not have to compute complex travel paths, even though such an option is possible. It would also be possible to generate second instructions that cause the unmanned aerial vehicle to travel directly from point B" to point C, as part of the sub-mission, if point Chas a known position. For many applications, the only second instruction required is one that moves the unmanned aerial vehicle 105 along a linear flight path to a second point, perform a payload data gathering action, and then return to the starting point.

In FIG. 9, when the unmanned aerial vehicle 105 passes or hovers at point C, no mission cue is detected, so no sub-mission down to the roof of house 606 is performed. It can be appreciated that this flight instruction scheme generates more data where that data is needed, and less where it isn't, increasing the efficiency of data storage and transmission.

Figure 10:
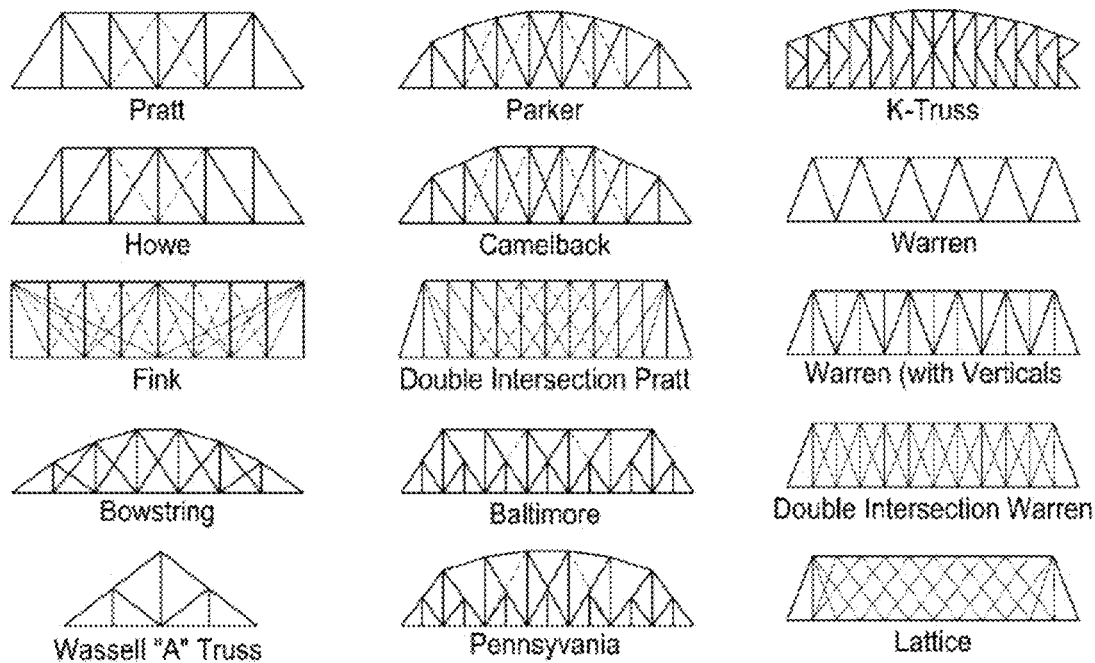
FIG. 10 is an illustration of various truss bridge designs.

These control techniques may also be advantageously used in other inspection applications. For example, as shown in FIG. 10, truss bridges have a variety of different designs that have truss joints in different locations. It is often necessary to inspect the truss joints for rust or other potential structural problems.

To do this with conventional programming and control of unmanned aerial vehicles a complex flight plan would have to be programmed into the memory 324, and that flight plan would have to be different for every different size or design of truss bridge that is being inspected, or the unmanned aerial vehicle would need to follow along all structural components of the bridge, taking images of many unnecessary components.

Figure 11A:
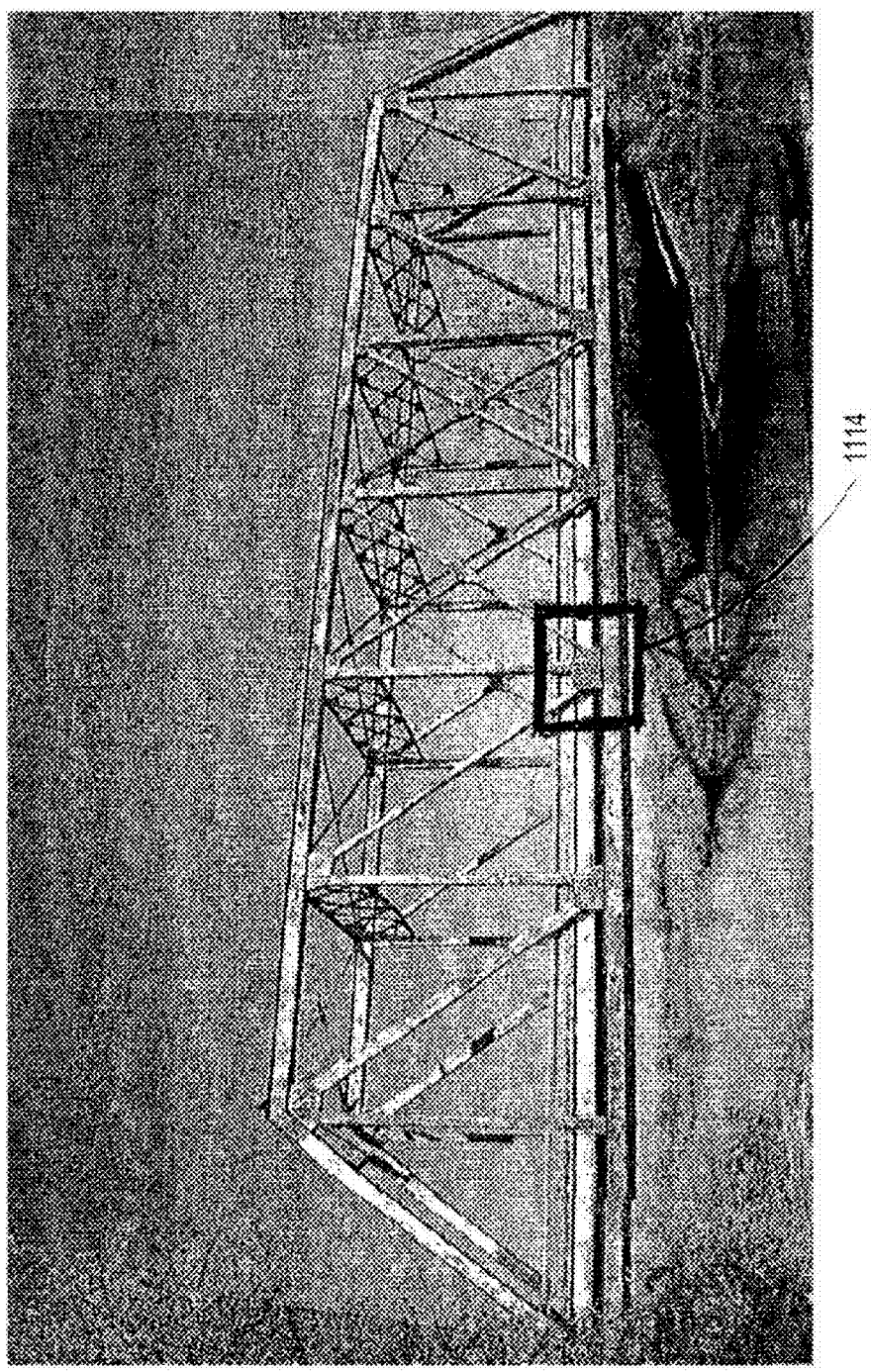
FIG. 11A is an example image generated by an unmanned aerial vehicle when performing an overall mission.
Figure 11B:
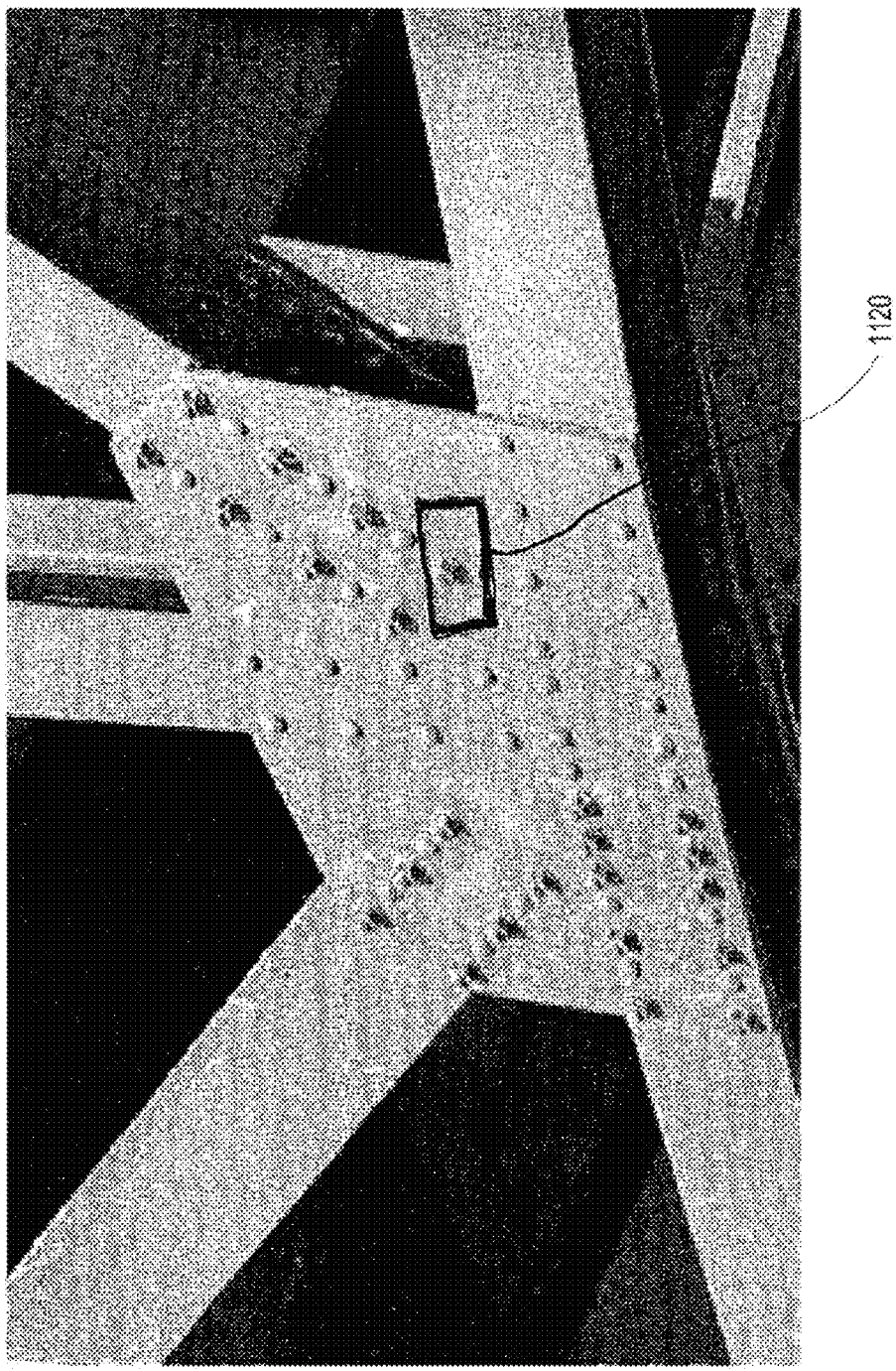
FIG. 11B is an example image generated by an unmanned aerial vehicle when performing a sub-mission of the overall mission of FIG. 11A.
Figure 11C:
FIG. 11C is an example image generated by an unmanned aerial vehicle when performing a sub-mission of the sub-mission of FIG. 11B.

With the techniques described herein, as shown in FIGS. 11A through 11C, this inspection process can be greatly simplified, making the use of unmanned aerial vehicles much more practical for this purpose and improving the user experience.

Referring first to FIG. 11A, the first instructions defining the overall mission may direct the unmanned aerial vehicle 105 to hover at a location relatively far from the bridge and take an image of the bridge from this location. An example such image is illustrated in FIG. 11A. Also programmed into the memory 324 may be mission cues that identify the location of the truss joints on the bridge, one of which is designated 1114 in FIG. 11B. These may be identified with image processing techniques that identify intersections of lines in an image, for example. When such a mission cue is detected, the processor 310 branches to second instructions that cause the unmanned aerial vehicle to travel toward the detected truss joint until it is a defined distance away and then take a photographic image such as shown in FIG. 11B. The second instructions may cause the processor to process the image to find a different image cue(s) such as the presence of an orange color in the image indicating rust. If this mission cue is detected, for example at the bolt 1120 of FIG. 11B, the processor may then branch to third instructions to perform a sub-mission of the first sub-mission, and approach even closer to a particular area of the truss joint and take a photographic image such as shown in FIG. 11C. After taking the photograph of FIG. 11C, the third instructions cause the unmanned aerial vehicle to return the point of the first submission where the image of FIG. 11B was taken. At that point the processor returns to processing the second instructions, which cause the unmanned aerial vehicle to return to the point of the overall mission where the photograph of FIG. 11A was taken. The processor then exits the second instructions and returns to the first instructions to continue with the overall mission.

It will be appreciated that with a series of nested instruction sets that are very simple in nature, just a few linear travel segments, a variety of inspection routines can be accomplished by appropriate mission cue detection without complex initial programming.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein compose one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. An unmanned aerial vehicle comprising:
   a camera configured to generate image data;
   one or more sensors configured to generate sensor data;
   memory storing one or more mission cues comprising one or more pre-defined image data characteristics and/or sensor data characteristics;
   memory storing first travel and data acquisition instructions that define an overall mission for the unmanned aerial vehicle;
   memory storing sub-missions configured in a nested manner to the overall mission, the sub-missions in the nested manner comprising at least a second sub-mission comprising second travel instructions and data acquisition instructions and at least a third sub-mission comprising third travel instructions;
   one or more processors configured to:
      interrupt the overall mission to selectively execute the second sub-mission in response to detecting at least one of the one or more mission cues and change a rate at which image data is generated and/or processed, and
      interrupt the second sub-mission to selectively execute the third sub-mission in response to detecting at least one of the one or more mission cues.

2. The unmanned aerial vehicle of claim 1, wherein a one of the one or more mission cues comprises a change in estimated topology along at least a portion of a flight path of the overall mission.

3. The unmanned aerial vehicle of claim 1, wherein the one or more processors configured to change a rate at which image data is generated and/or processed further comprises:
   the one or more processors configured to change a rate at which the camera generates image data.

4. The unmanned aerial vehicle of claim 1, wherein the one or more processors configured to change a rate at which image data is generated and/or processed further comprises:
   the one or more processors configured to change a rate at which the camera generates image data.

5. An unmanned aerial vehicle comprising:
   a camera configured to generate image data;
   one or more sensors configured to generate sensor data;
   memory storing one or more mission cues comprising one or more pre-defined image data characteristics and/or sensor data characteristics;
   memory storing first travel instructions and first data acquisition instructions that define an overall mission for the unmanned aerial vehicle, the first data acquisition instructions defining a rate at which image data is generated and/or processed;
   memory storing sub-missions configured in a nested manner to the overall mission, the sub-missions comprising at least a second sub-mission comprising second travel instructions and second data acquisition instructions and at least a third sub-mission comprising third travel instructions;
   one or more processors configured to:
      interrupt the overall mission to selectively execute the second sub-mission in response to detecting at least one of the one or more mission cues and change the rate at which image data is generated and/or processed, and
      interrupt the second sub-mission to selectively execute the third sub-mission in response to detecting at least one of the one or more mission cues.

6. The unmanned aerial vehicle of claim 5, wherein a one of the one or more mission cues comprise a change in estimated topology along at least a portion of a flight path of the overall mission.

7. The unmanned aerial vehicle of claim 5, wherein the one or more processors configured to change a rate at which image data is generated and/or processed are further configured to:

change a rate at which the camera generates image data.

8. The unmanned aerial vehicle of claim 5, wherein the one or more processors configured to change a rate at which image data is generated and/or processed are further configured to:

lower a rate at which the camera generates image data.

9. An unmanned aerial vehicle comprising:

a camera and one or more sensors configured to generate aerial data comprising image data and sensor data;

memory storing one or more mission cues comprising one or more pre-defined image data characteristics and/or sensor data characteristics;

memory storing first travel instructions and first data acquisition instructions that define an overall mission for the unmanned aerial vehicle; and one or more processors configured to:
  process at least one of the image data and the sensor data to detect a presence of at least one of the one or more mission cues, and
  in response to the detecting, change a rate at which at least some of the aerial data is generated and/or processed based at least in part on the at least one detected mission cue.

10. The unmanned aerial vehicle of claim 9, wherein the one or more processors are further configured to:

change a rate at which image data is generated and/or processed.

11. The unmanned aerial vehicle of claim 9, wherein the one or more processors are further configured to:

change a rate at which the camera generates image data.

12. The unmanned aerial vehicle of claim 9, wherein the detected mission cue comprises a change in estimated topology along at least a portion of a flight path of the overall mission.

13. The unmanned aerial vehicle of claim 9, wherein the detected mission cue comprises a predefined above-ground structure.

* * * * *